(12) United States Patent
Uligere Narasimhamurthy et al.

(10) Patent No.: US 11,593,236 B2
(45) Date of Patent: *Feb. 28, 2023

(54) PRESERVING DATA INTEGRITY DURING CONTROLLER FAILURES

(71) Applicant: Seagate Technology LLC, Fremont, CA (US)

(72) Inventors: Adithya Uligere Narasimhamurthy, Longmont, CO (US); Ritvik Viswanatha, Longmont, CO (US); Michael Barrell, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,351

(22) Filed: May 4, 2022

(65) Prior Publication Data
US 2022/0261322 A1 Aug. 18, 2022

Related U.S. Application Data

(63) Continuation of application No. 16/990,994, filed on Aug. 11, 2020, now Pat. No. 11,327,858.

(51) Int. Cl.
*G06F 11/20* (2006.01)
*G06F 12/0806* (2016.01)

(52) U.S. Cl.
CPC ...... *G06F 11/2092* (2013.01); *G06F 11/2071* (2013.01); *G06F 12/0806* (2013.01); *G06F 2201/82* (2013.01); *G06F 2212/1032* (2013.01); *G06F 2212/222* (2013.01)

(58) Field of Classification Search
CPC ............ G06F 11/2092; G06F 11/2071; G06F 12/0806; G06F 2201/82; G06F 2212/1032; G06F 2212/222
See application file for complete search history.

(56) References Cited

U.S. PATENT DOCUMENTS

| 4,530,054 | A | * | 7/1985 | Hamstra | ............. | G06F 12/0804 |
| | | | | | | 711/E12.04 |
| 5,530,842 | A | | 6/1996 | Abraham et al. |
| 5,613,068 | A | | 3/1997 | Gregg et al. |
| 5,619,642 | A | | 4/1997 | Nielson et al. |
| 5,680,579 | A | | 10/1997 | Young et al. |
| 5,802,561 | A | | 9/1998 | Fava et al. |
| 6,023,748 | A | | 2/2000 | Peters et al. |
| 6,038,680 | A | | 3/2000 | Olarig |
| 6,058,455 | A | | 5/2000 | Islam et al. |
| 6,065,102 | A | | 5/2000 | Peters et al. |

(Continued)

FOREIGN PATENT DOCUMENTS

WO   WO-2007047438 A2 * 4/2007 .......... G06F 11/2066

*Primary Examiner* — Joseph O Schell
*Assistant Examiner* — Indranil Chowdhury
(74) *Attorney, Agent, or Firm* — Christian W. Best

(57) ABSTRACT

Systems and processes are disclosed to preserve data integrity during a storage controller failure. In some examples, a storage controller of an active-active controller configuration can back-up data and corresponding cache elements to allow a surviving controller to construct a correct state of a failed controller's write cache. To accomplish this, the systems and processes can implement a relative time stamp for the cache elements that allow the backed-up data to be merged on a block-by-block basis.

20 Claims, 7 Drawing Sheets

(56) References Cited

U.S. PATENT DOCUMENTS

| | | | | |
|---|---|---|---|---|
| 6,243,829 | B1 | 6/2001 | Chan | |
| 6,247,099 | B1 | 6/2001 | Skazinski et al. | |
| 6,279,119 | B1* | 8/2001 | Bissett | G06F 11/1691 712/229 |
| 6,490,659 | B1* | 12/2002 | McKean | G06F 11/2089 711/E12.019 |
| 6,574,709 | B1* | 6/2003 | Skazinski | G06F 11/2097 711/119 |
| 6,690,534 | B2 | 2/2004 | Ding et al. | |
| 6,698,022 | B1 | 2/2004 | Wu | |
| 6,732,243 | B2 | 5/2004 | Busser et al. | |
| 6,766,491 | B2 | 7/2004 | Busser | |
| 6,874,100 | B2* | 3/2005 | Rauscher | G06F 11/2089 714/6.21 |
| 6,996,672 | B2 | 2/2006 | Lubbers et al. | |
| 7,062,591 | B2 | 6/2006 | Pecone | |
| 7,107,320 | B2 | 9/2006 | Busser et al. | |
| 7,143,227 | B2 | 11/2006 | Maine | |
| 7,149,819 | B2 | 12/2006 | Pettey | |
| 7,246,256 | B2* | 7/2007 | De La Cruz | G06F 11/2025 714/4.11 |
| 7,315,911 | B2 | 1/2008 | Davies et al. | |
| 7,328,324 | B2 | 2/2008 | Wang et al. | |
| 7,340,555 | B2 | 3/2008 | Ashmore et al. | |
| 7,366,843 | B2 | 4/2008 | Cypher et al. | |
| 7,380,055 | B2 | 5/2008 | Ashmore | |
| 7,380,115 | B2 | 5/2008 | Maine | |
| 7,380,163 | B2 | 5/2008 | Davies et al. | |
| 7,418,621 | B2 | 8/2008 | Ashmore | |
| 7,444,541 | B2 | 10/2008 | Lubbers et al. | |
| 7,480,815 | B2 | 1/2009 | Rust et al. | |
| 7,536,495 | B2 | 5/2009 | Ashmore et al. | |
| 7,536,508 | B2 | 5/2009 | Davies | |
| 7,558,981 | B2* | 7/2009 | Ashmore | G06F 11/2066 711/113 |
| 7,627,780 | B2 | 12/2009 | Davies | |
| 7,669,080 | B2* | 2/2010 | Lind | G06F 11/2097 714/11 |
| 7,681,089 | B2 | 3/2010 | Ashmore | |
| 7,809,886 | B2 | 10/2010 | Ashmore et al. | |
| 8,301,593 | B2 | 10/2012 | Hoffmann et al. | |
| 8,356,126 | B2 | 1/2013 | Ashmore | |
| 8,788,665 | B2 | 7/2014 | Gilde et al. | |
| 8,868,504 | B2 | 10/2014 | Aranha et al. | |
| 8,880,800 | B2 | 11/2014 | Mathew et al. | |
| 9,053,073 | B1* | 6/2015 | Subramanian | G06F 11/2082 |
| 9,684,598 | B1* | 6/2017 | Devor | G06F 12/0824 |
| 9,804,781 | B2 | 10/2017 | Kowles | |
| 9,830,088 | B2* | 11/2017 | Chandrashekar | G06F 12/0868 |
| 10,303,365 | B1 | 5/2019 | Wu et al. | |
| 10,884,632 | B2* | 1/2021 | Messing | G06F 3/0616 |
| 11,126,381 | B1* | 9/2021 | Dreier | G06F 11/1441 |
| 2003/0217211 | A1 | 11/2003 | Rust et al. | |
| 2004/0030837 | A1* | 2/2004 | Geiner | G06F 11/2064 714/E11.107 |
| 2004/0236983 | A1* | 11/2004 | Burton | G06F 11/2082 714/6.23 |
| 2005/0010838 | A1* | 1/2005 | Davies | G06F 11/2092 714/100 |
| 2006/0212644 | A1* | 9/2006 | Acton | G06F 1/30 711/E12.019 |
| 2008/0005614 | A1* | 1/2008 | Lubbers | G06F 11/2092 714/11 |
| 2008/0307160 | A1* | 12/2008 | Humlicek | G06F 12/0804 711/143 |
| 2013/0191601 | A1* | 7/2013 | Peterson | G06F 12/0868 711/E12.017 |
| 2014/0351534 | A1* | 11/2014 | Crawford | G06F 3/0614 711/162 |
| 2015/0012699 | A1 | 1/2015 | Rizzo et al. | |
| 2015/0052385 | A1* | 2/2015 | Galbraith | G06F 11/2097 714/6.3 |
| 2016/0328303 | A1* | 11/2016 | Brandner | G06F 11/2069 |
| 2017/0046268 | A1* | 2/2017 | Ummadi | G06F 11/2089 |
| 2017/0097876 | A1* | 4/2017 | Craddock | G06F 11/2294 |
| 2017/0315725 | A1* | 11/2017 | McKean | G06F 12/0866 |
| 2019/0102264 | A1* | 4/2019 | Boden | G06F 11/2082 |
| 2020/0142787 | A1* | 5/2020 | Thatikonda | G06F 3/0647 |
| 2021/0019093 | A1* | 1/2021 | Karr | G06F 3/0685 |
| 2022/0179761 | A1* | 6/2022 | McAuliffe | G06F 11/2028 |

* cited by examiner

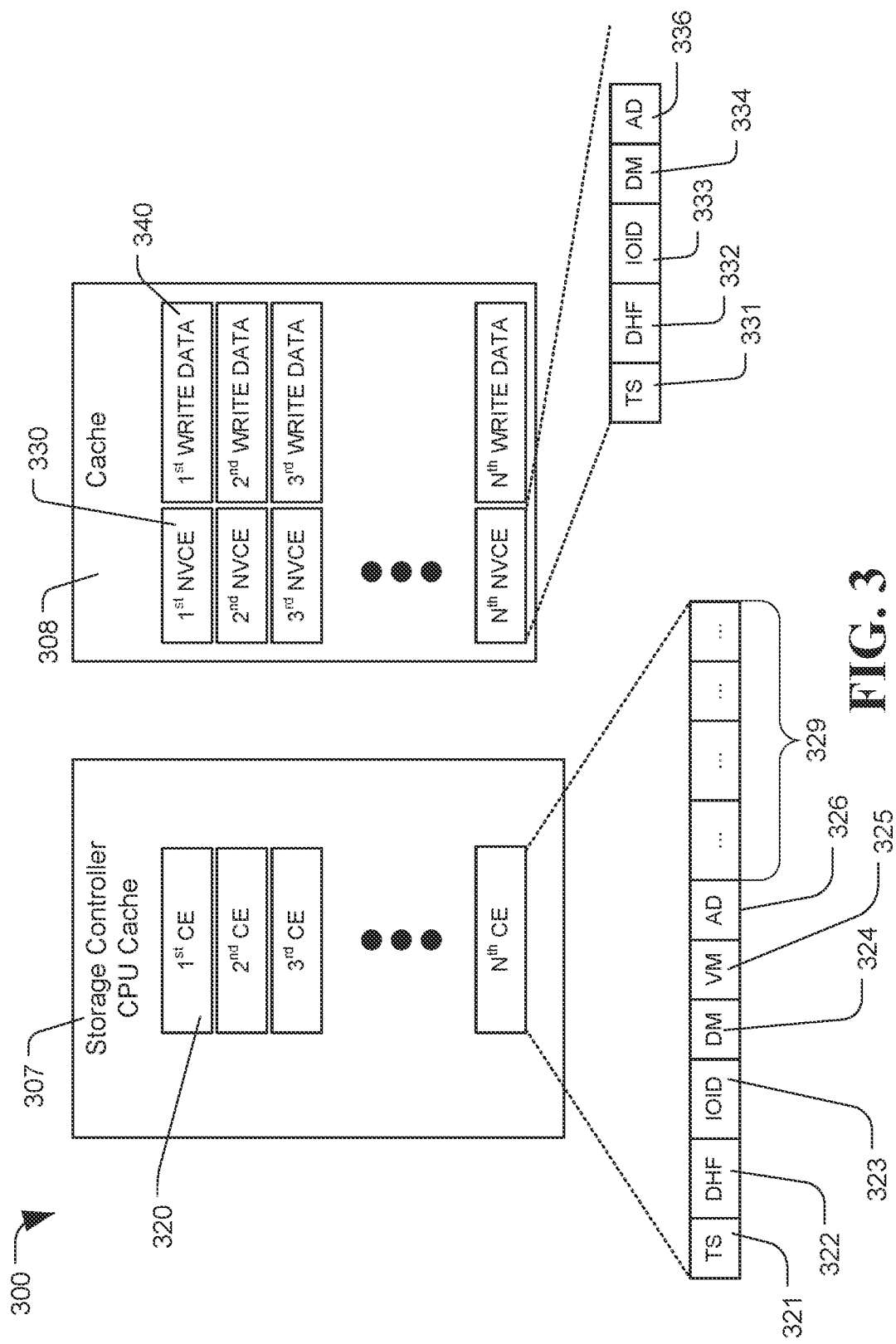

NVCE Examples

| NVCE | IOID | TS | DM | DHF | LBA |
|---|---|---|---|---|---|
| 1st NVCE | 1st IOID: 0101 | 1st TS: 0122 | 1st DM: 01010100 | 1st DHF: 0 | LBA 1024 |
| 2nd NVCE | 2nd IOID: 1101 | 2nd TS: 0121 | 2nd DM: 11111111 | 2nd DHF: 0 | LBA 3468 |
| 3rd NVCE | 3rd IOID: 0101 | 3rd TS: 0120 | 3rd DM: 01010111 | 3rd DHF: 0 | LBA 0880 |
| 4th NVCE | 4th IOID: 0001 | 4th TS: 0119 | 4th DM: 00000001 | 4th DHF: 0 | LBA 1024 |
| 5th NVCE | 5th IOID: 1101 | 5th TS: 0118 | 5th DM: 00101000 | 5th DHF: 1 | LBA 1024 |
| 6th NVCE | 6th IOID: 0111 | 6th TS: 0117 | 6th DM: 01010000 | 6th DHF: 0 | LBA 1024 |
| 7th NVCE | 7th IOID: 0101 | 7th TS: 0116 | 7th DM: 01010101 | 7th DHF: 0 | LBA 3468 |
| 8th NVCE | 8th IOID: 1101 | 8th TS: 0115 | 8th DM: 00001111 | 8th DHF: 0 | LBA 2222 |
| 9th NVCE | 9th IOID: 1111 | 9th TS: 0114 | 9th DM: 01010110 | 9th DHF: 0 | LBA 1024 |
| 10th NVCE | 10th IOID: 0101 | 10th TS: 0113 | 10th DM: 11111111 | 10th DHF: 0 | LBA 1208 |
| 11th NVCE | 11th IOID: 1101 | 11th TS: 0112 | 11th DM: 01010101 | 11th DHF: 0 | LBA 4668 |
| 12th NVCE | 12th IOID: 0101 | 12th TS: 0111 | 12th DM: 11111111 | 12th DHF: 0 | LBA 1908 |

Cache 400, 408

FIG. 4

PRESERVING DATA INTEGRITY DURING CONTROLLER FAILURES

CROSS-REFERENCE TO RELATED APPLICATIONS

The present application is a continuation of and claims priority to pending U.S. patent application, application Ser. No. 16/990,994, filed Aug. 11, 2020, entitled "PRESERVING DATA INTEGRITY DURING CONTROLLER FAILURES", the contents of which are hereby incorporated by reference in their entirety.

SUMMARY

In certain embodiments, a server computer system can include a first storage controller configured to connect to a backplane or midplane; a second storage controller configured to connect to the backplane or midplane; where the first storage controller and the second storage controller can be configured to operate in an active-active controller configuration where both controllers are actively available to support data write operations from a host. Further, the first controller can be configured to mirror first data corresponding to a first write operation intended for a second storage controller into a first memory, the mirrored first data including a first nonvolatile cache element corresponding to payload data of the first write operation, the first nonvolatile cache element including a first relative timestamp based on an order the second storage controller received the first write operation from a host. When the second storage controller fails, the first storage controller can be further configured to recreate a state of the second storage controller's write cache based on the first nonvolatile cache element and the first relative timestamp; merge the mirrored first data on a block-by-block basis with data corresponding to multiple write operations received by the second storage controller, which have overlapping first write locations, based on the first relative timestamp to produce a first new cache element that indicates selected data from more than one of the multiple write operations received by the second controller to be written to the first write locations; and write the data blocks identified in the first new cache element to the first write locations. Even further, the second controller can be configured to mirror second data corresponding to a second write operation intended for the first storage controller into a second memory, the mirrored second data including a second nonvolatile cache element corresponding to payload data of the second write operation, the second nonvolatile cache element including a second relative timestamp based on an order the first storage controller received the second write operation from a host. When the first storage controller fails, the second storage controller can be further configured to recreate a state of the first storage controller's write cache based on the second nonvolatile cache element and the second relative timestamp; merge the mirrored second data on a block-by-block basis with data corresponding to multiple write operations received by the first storage controller that have overlapping write locations based on the relative timestamp to produce a new cache element that indicates selected data from more than one of the multiple write operations to be written to the write locations; and write the data blocks identified in the new cache element to the write locations.

In certain embodiments, an apparatus can comprise a first storage controller subsystem configured to operate in an active-active controller configuration with a second storage controller subsystem and manage host data write operations, the first storage controller subsystem including: a first interface configured to connect to a backplane or midplane and configured to receive the host data write operations; a first memory; and a first memory controller. The first memory controller can be configured to mirror data corresponding to a host write operation intended for the second storage controller subsystem into the first memory, the mirrored data including a nonvolatile cache element (NVCE) corresponding to the data of the host write operation, the NVCE including a relative timestamp based on an order the second storage controller subsystem received the host write operation corresponding to the mirrored data. Further, when the second controller subsystem fails, the first storage controller subsystem can recreate a state of the second storage controller subsystem's write cache based on the NVCE and the relative timestamp; merge the mirrored data with data corresponding to other write operations received by the second controller that have overlapping write locations, perform the merge on a block-by-block basis based on the relative timestamp, produce a new cache element indicating the data to be written to the write locations as an output of the merge process; and write the data blocks corresponding to the new cache element to the write locations based on the new cache element.

In certain embodiments, a method can include operating a first storage controller subsystem in an active-active controller configuration with a second controller subsystem to manage host data write requests to a data storage array; performing, at the first storage controller subsystem, relative time stamp dating of data received from a host and stored in a write cache to maintain a logical write order while executing write operations; mirroring backup data, at the first storage controller subsystem, corresponding to host writes intended for the second controller subsystem into the write cache, the backup data including a cache element including information to allow the first storage controller subsystem to determine which data is newest on a block-by-block basis based on a relative time stamp of the cache element; determining a failure condition of the second controller subsystem; and when the failure condition is determined, reconstructing the second controller subsystem's write cache via the backup data by selecting the backup data on a block-by-block basis based on the relative time stamp of the cache element.

BRIEF DESCRIPTION OF THE DRAWINGS

FIG. 3 is a diagram of a system for preserving data integrity during storage controller failure, in accordance with certain embodiments of the present disclosure;

FIG. 4 is a diagram of a system for preserving data integrity during storage controller failure, in accordance with certain embodiments of the present disclosure;

DETAILED DESCRIPTION

Figure 1:
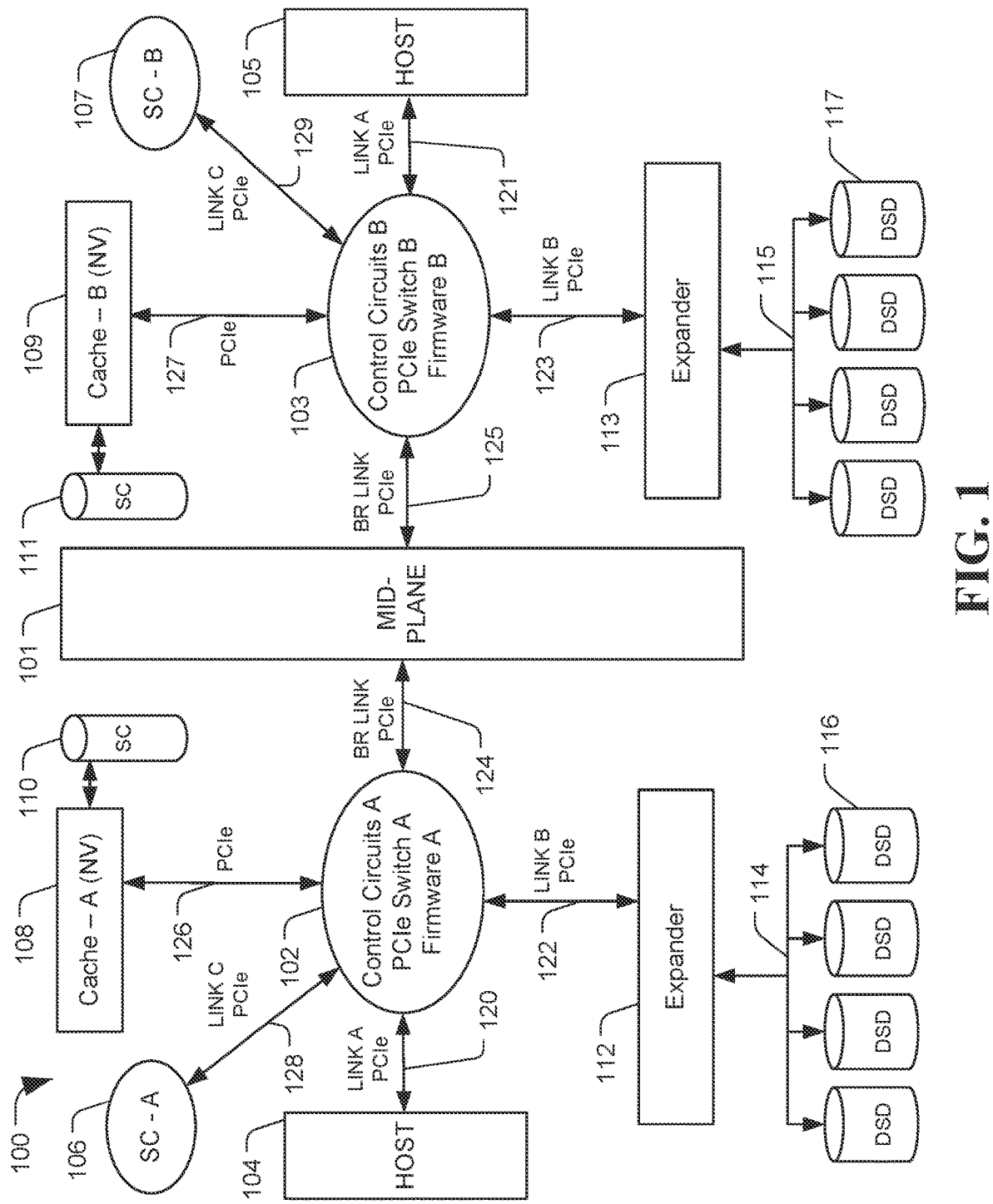
FIG. 1 is a diagram of a system for preserving data integrity during storage controller failure, in accordance with certain embodiments of the present disclosure.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, computer(s), application specific integrated circuit(s) (ASIC(s)), programmable logic arrays, system-on-chip (SoC), server(s), and other hardware devices can likewise be constructed to implement the systems, circuits, functions, processes, and methods described herein. Processes, methods, and functions herein may be performed by modules, nodes, or engines, or a combination thereof, any of which may include one or more physical components of one or more computing device(s) (e.g., logic, circuits, processors, controllers, memory, etc.) configured to perform a particular task or job, or may include instructions that, when executed, can cause one or more processors to perform a particular task or job, or may be any combination thereof. Further, the processes described herein may be implemented as a computer readable storage medium or memory device including instructions that, when executed, cause a processor to perform the methods.

A storage controller electronically communicates with one or more host computing devices to provide the systems and processes for the storage and retrieval of data from persistent data storage. Some systems can include multiple storage controllers, such as in a dual active-active storage controller configuration that can provide added storage controller redundancy to maintain data integrity if one of the controllers fail. With the active-active storage controller approach, at least two controllers are actively available to support logical unit numbers (LUNs) and volumes while each of the storage controllers can have specific LUNs assigned to them for processing of data storage operations. If a controller fails, the surviving controller(s) can support the data storage operations for its and the failed controller's LUNs. To minimize data loss if one of the storage controller fails, data may be mirrored between the multiple storage controllers.

For an active-active storage controller configuration with data mirroring ability, at any given instant in time, duplicate data can exist in a data cache for a given set of blocks that are involved in a host write. The duplicate data may need to be merged before being stored to long term nonvolatile storage (e.g. a final nonvolatile storage destination mapped to LBAs associated with a write operation, sometimes referred to as persistent media or persistent storage), such as RAID (Redundant Array of Inexpensive Discs). If the storage controller that is performing the write fails before the merge completes, all the information related to the write may be lost. With the systems and processes disclosed herein, the surviving controller can reconstruct the cache of the failed controller, merge the cached data in the correct order with the limited knowledge of the write information, and write the correct host data to the long term storage thus preserving data integrity.

The systems and methods herein can preserve data integrity during controller failures by relative time ordering of user data and merging the user data on a surviving controller. While the examples provided herein are discussed with reference to a dual active-active controller system, the systems and processes disclosed herein can also be applied to a system with more than two controllers. Thus, the systems and processes herein are scalable to various multiple controller configurations. For example, the systems and processes described herein can also be applied to active-passive controller configurations, provided the controller that is passive receives the data (e.g., via mirroring or some other mechanism) and then uses the processes described herein to detect and merge the duplicate data. Also note that the processes described herein can also be applied in a single controller scenario too.

FIG. 1 shows a diagram of a system for preserving data integrity during controller failure, generally designated 100, in accordance with certain embodiments of the present disclosure. System 100 may be a server computer system utilized to perform the methods, processes, and functions described herein. System 100 can include storage controllers 102 and 103 that can communicate with hosts 104 and 105 via communication links 120 and 121; storage controllers 102 and 103 may each also be referred to as a storage controller subsystem. The system 100 can also include memory caches 108 and 109, which may be coupled to capacitors (SC) 110 or 111, which can provide power for at least a portion of the caches 108 or 109 to be nonvolatile while the capacitors 110 or 111 contain enough power, which may also include a combination of circuit(s) or module(s) configured to implement a capacitor based cache backup routine upon detection of a power event or similar. The caches 108 and 109 may be coupled to the storage controllers 102 or 103 via a communication link 126 or 127, which in some examples may be PCIe (Peripheral Component Interconnect Express) buses.

In some embodiments, additional storage controllers 106 and 107 (which may sometimes be referred to as a memory controller(s) to provide some distinction from the storage controller subsystem(s)) may each be separate controllers from storage controllers 102 and 103, and may be communicatively coupled to the storage controllers 102 or 103 via a communication links 128 or 129, which in some examples may be PCIe links. The capacitor control circuits 106 or 107 can include separate firmware that is executable to perform the functions, operations, and processes described herein.

Storage controllers 106 and 107 may each be coupled to a mid-plane or back-plane system 101 via communication links 124 or 125, which can be a backbone to allow multiple storage controllers and devices to be physically coupled via a computer bus, and in some examples may be a PCIe mid-plane that includes PCIe bridge links. Storage controllers 106 and 107 may each be coupled to expanders 112 or 113 via communication links 122 or 123, which may be physical interface PCIe links through the midplane/backplane. In some embodiments, the physical interface connections that can be utilized are: 1) a PCIe broadcast link that can be used to transfer data between the controllers; and 2) a hardware communication link that connects complex programmable logic device(s)(CPLD(s)) on each controller board, which can allow the controller firmware to set CPLD register states to allow heartbeat signal exchange between the partner controllers and allow resetting the partner controller. A CPLD can include a combination of a fully programmable logic array and a bank of macrocells. The logic array can be reprogrammable and can perform a multitude of logic functions. Macrocells are functional blocks that perform combinatorial or sequential logic, and also have the added flexibility for true or complement, along with varied feedback paths. Expanders 112 and 113 may be coupled to an array of nonvolatile data storage devices 116 or 117 via data buses 114 or 115, which may be disc based data storage devices, solid state data storage devices, a combination thereof, or any other type of nonvolatile memory device.

For a storage controller, such as storage controller 106 or 107, to efficiently write the data on to the data storage devices, such as data storage devices 116 or 117, the storage controller can engage all the data storage devices for a given raid configuration. The firmware of the storage controller can achieve this by performing striped writes. An example of a striped write is a full stripe write (FSW) that involves writing the cached data in sequential order where every drive gets a constant chunk of the data where the chunk size is constant (e.g., 1024 blocks of data). Full stripe writes can be desirable for various reasons, however, because of the randomness of the host writes, a full stripe write cannot be performed every time. Another example of a striped write is an efficient Partial Stripe Write (ePSW) where the firmware can read missing blocks from the data storage devices to fill in blocks of data in the cached data that was not more recently received from a host for a given stripe, thus, building a full stripe in the cache that can then be written out to the data storage devices. This can provide a better write performance compared to writing a partially filled stripe.

The storage controllers 106 and 107 can be equipped with the additional data ram 108 and 109, respectively, to hold the host data, which is intended to be written out to persistent data storage 116 or 117 at a later time. Thus, this memory region can act as a storage controller cache to provide faster access to write host data. The storage controller can also have a mirroring capability to mirror any data that is written into this memory region to the corresponding cache on the partner storage controller. Further, this region can be backed up during a storage controller fail (e.g. power failure) and can be used to reconstruct its cache memory after rebooting from a failure. In some examples, a mirroring capability can be performed by configuring selected memory ranges to be mirrored by the hardware (e.g., Control Circuits A/B 106/107 in this case using Firmware A/B) such that anytime a particular cache range is accessed on one controller for a write operation, the hardware automatically writes/mirrors the same data into a memory of the partner controller for holding duplicate data of the same address range.

During operation, system 100 may service a host write operation via a lockless write cache (LWC) process, which may be performed by storage controller 106 or 107 via executing the firmware stored therein, respectively. A write operation can consist of metadata and a payload storing the host data intended to be stored to a persistent data storage; the host data may be of a specific size (or amount) and can be organized into segments, which may be referred to as blocks. For example, a write operation may include 64 blocks of host data in a payload, where each block of data contains 4 KB of data, thus the whole data payload of the write operation in this example includes 256 KB of data. When a write operation is received, the firmware may execute different stages of the operation before it is completed. Example stages that may be executed can include an allocate memory stage, transfer data stage, a backup validation stage, a notification stage, a merge data stage, a duplicate invalidation stage, a completion stage, other stages, or a combination thereof. Further detailed examples are provided below.

In an allocate memory stage, the firmware may allocate the cache memory 108 or 109 needed for the write by allocating and populating the information for one or more cache element(s) (CE) corresponding to the write operation. The corresponding nonvolatile cache element(s) (NVCE) may also be created and populated at this time in a memory space that is nonvolatile, such as a portion of the cache 108 or 109 that is nonvolatile due to being protected by a capacitor.

A cache element (CE) can be a data structure that can contain various pieces of information to describe a data buffer containing a specific number of blocks of user data (e.g., 64 blocks of user data). A CE can be constructed in the CPU memory (e.g. the CPU 280 or 281 of data controller 204 or 205) and can contain various data fields, such as bitmasks (e.g., dirty bit mask, valid bit mask, lock bit, etc.) or address fields, indicating a location or state of the cache element that is involved in a specific read or write operation. A read or write operation can be made up of one or more CEs, indicating the cache region (via logical addressing such as an LBA range) that is being used. In some embodiments, the CEs are not persistent and will be lost if the storage controller fails (e.g., loses power).

A NVCE can be a data structure that is a backed up version of a specific CE. A NVCE can contain a subset of data fields that are present in the corresponding CE. In some embodiments, the CEs and NVCEs share a one to one mapping and are used to reconstruct the cache state when a storage controller boots up or when a surviving storage controller takes over a partner storage controller's cache in the event of failure.

Examples of data fields that can be included in a CE, a NVCE, or both are described herein; specifically, FIG. 3 and the description thereof provides examples of such data fields. For example, CEs can be constructed on the storage controller's CPU cache 106, while the NVCEs can be stored in memory cache 108. Thus, the system 100 can use the backed up NVCEs to build CEs on the storage controller's CPU cache 106 for faster access and lookup.

In a transfer data stage, the firmware may transfer the data received from the host, which may have been previously stored in a volatile cache of the controller 106 or 107 via an interface coupled to the host 104 or 105, to the allocated cache memory 108 or 109. At this stage, the firmware may also mirror the host data to the partner controller 106 or 107. The firmware may update the dirty and valid masks of the CEs to indicate they have dirty and valid data in them while updating the time stamp within each updated CE to the current time. The firmware may also include a backup validation stage for the NVCEs where the corresponding NVCEs are updated with the current information as the CE, such as the same dirty mask and time stamps.

In a notification stage, the firmware may initiate the sending of a notification to the host 104 or 105 that the write transaction is complete once the backup NVCE has been validated. The notification can indicate to the host 104 or 105 that it can initiate another write transaction to the same blocks if needed. Duplicate data and duplicate CEs can be created in the memory cache 108 or 109 when the host initiates overlapped writes (e.g., write operations cached to be executed having overlapping logical block addresses).

In a merge data stage, the firmware may inspect CEs to determine duplicate data and merge them accordingly since there can be multiple versions of user data that can exist before the data is stored to the data storage devices 116 or 117. In some examples, the data merge stage can be performed by having the controller 106 or 107 inspect two or more different CEs for the same LBA block range and identify any overlaps of the LBA range that need to be resolved. In further embodiments, the firmware may identify any gaps that needed to be filled, which can then be filled via an ePSW process. The overlaps and gaps, if applicable, can then be merged into a merged CE, which is then marked as dirty and valid.

In a duplicate invalidation stage, the firmware may mark any duplicate CEs as not valid and clean, since the blocks that were dirty had already been merged into the new merged CE in the previous stage. Corresponding NVCEs on the partner controller 106 or 107 can also be marked as not valid and clean at this stage.

In a completion stage, the firmware may deallocate resources that were allocated for the write operation, which can then indicate the completion of the write operation.

The LWC mode of operation of the controller 106 or 107 can create a window during the merge data stage and the duplicate invalidation stage, in which if the controller servicing the write operation fails, there can be duplicate CEs that are still marked as dirty. This creates a problem on the surviving controller to resolve the duplicates in the exact order as the host had written them and to merge them as needed to preserve the data integrity. Thus, to solve for this problem and other problems, a surviving storage controller can execute the data integrity processes described herein, such as the processes 500, 600, or 700.

Figure 2:
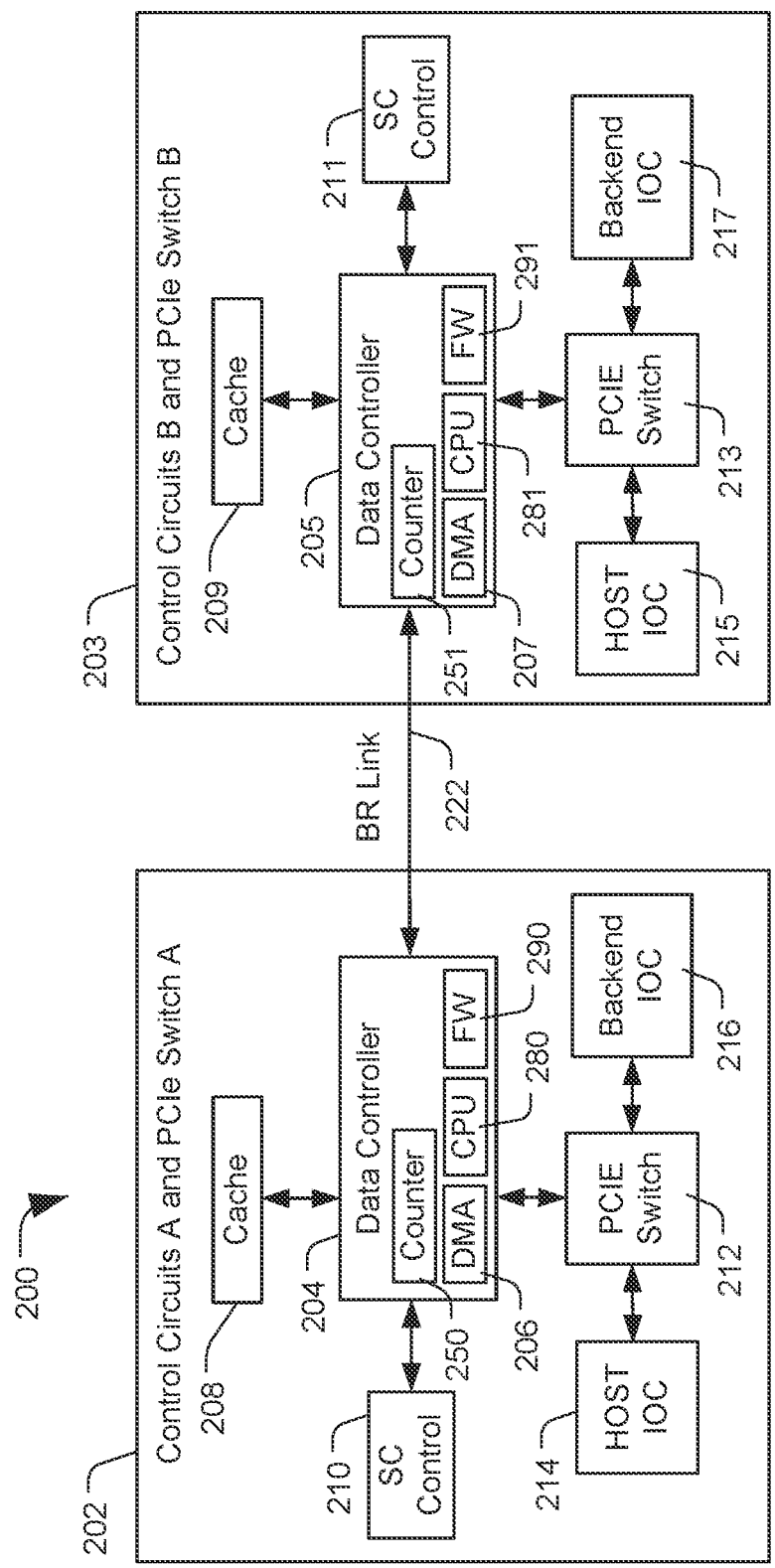
FIG. 2 is a diagram of a system for preserving data integrity during storage controller failure, in accordance with certain embodiments of the present disclosure.

FIG. 2 shows a diagram of a system for preserving data integrity during controller failure, generally designated 200, in accordance with certain embodiments of the present disclosure. System 200 is an example implementation of circuits 106 and 107 that may be utilized to perform the methods, processes, and functions described herein. System 200 can include storage controllers 202 and 203, which may each include a data controller circuit 204 or 205 and a PCIe switch 212 or 213. The storage controllers 202 and 203 can also each include a central processing unit (CPU) 280 or 281, which may be within the storage controller 204 or 205 or a processing unit distinct from a controller circuit, a cache 208 or 209, a capacitor control circuit 210 or 211, a host interface control circuit 214 or 215, and a data storage interface control circuit 216 or 217. Caches 208 and 209 can be volatile random access memory (RAM), which can be separate from the RAM of caches 108 and 109. Note that neither the memory of caches 108 and 109 nor the memory of caches 208 and 209 are required to be nonvolatile memory; the processes herein can be applied to reconstruct data whether such memory is volatile memory or nonvolatile memory. The data controller circuits 204 and 205 may each include memory storing executable firmware 290 or 291, a direct memory access (DMA) control circuit 206 or 207, and a counter 250 or 251. The data controller circuits 204 and 205 may be communicatively coupled via a communication bus 222, such as a PCIe bridge link.

During operation, system 200 may utilize the data controller 204 or 205, via the CPU 280 or 281, the DMA control circuit 206 or 207, the counter 250 or 251, and the firmware 290 or 291, to perform the processes, methods, and functions described herein. The host interface control circuit 214 or 215 may be utilized to receive and send operations from and to a host device, thus providing input and output control (IOC) of data between the storage controller 202 or 203 and a host. The data storage interface control circuit 216 or 217 may be utilized to receive and send operations from and to persistent data storage, such as an array of nonvolatile data storage devices, thus providing input and output control (IOC) of data between the storage controller 202 or 203 and persistent data storage.

The controller 204 or 205 can be configured to utilize the counter 250 or 251 to provide a relative time stamp for received operations. The counter 250 or 251 may be hardware, software, or a combination thereof. For example, the counter may be a counter circuit that increments a number relative to a system clock and stores the incremented value in a memory space, where the memory space can be accessed and copied when an operation needs a relative time stamp. The counter 250 or 251 can also include a reset function that allows control of the counter to be set to a specific value or reset to an initial value.

The PCIe switch 212 or 213 can be utilized to provide a managed data bus between the data controller 204 or 205 and peripheral devices, such as a large number of nonvolatile data storage devices (e.g. data storage arrays 116 and 117). PCIe utilizes a packet based communications protocol controlling traffic through each switch and provides numerous features such as quality of service (QoS), hot plugging, interrupt handling, and error handling services, as well as other features. Packets of data can be routed through switches based upon memory address, input output (I/O) address, device ID or by implicit transactions.

The communication bus 222, which may be a PCIe bridge link, may allow for direct communication of data (e.g., metadata, host data, CE updates, NVCE updates, etc.) between storage controllers 202 and 203. System 200 may utilize the communication bus 222 to transmit the information necessary to allow the backup of data, such as NVCEs or host data, between the storage controllers 202 and 203. For example, the storage controller 202 may transmit an update of a NVCE to the storage controller 203, and vice versa, such that each storage controller has a backup of the other storage controllers NVCEs.

In some embodiments, a controller to controller data backup can happen in various steps. In a first step, the data coming in from the host can be automatically mirrored over to the partner controller's cache by the hardware. The firmware can program the hardware with the cache memory address ranges that need to be mirrored over this way. In a second step, the NVCE updates can be mirrored over by the storage controller firmware as part of the "Invalidation of the CEs", "Validating the NVCEs", "Merge the user data" and "Invalidation of duplicates" steps described above. For example, the storage controller firmware can program the hardware DMA engines 206/207 in the data controller 204/205 to transfer the NVCE data at the NVCE addresses in cache memory to the partner controller. In a third step, the host data in the merged CE in the "Merge the user data" step described above can be mirrored over to the partner controller's cache the same way that NVCE updates are mirrored over.

FIG. 3 shows a diagram of a system for preserving data integrity during controller failure, generally designated 300, in accordance with certain embodiments of the present disclosure. System 300 is an example implementation of circuits and data structures that can be utilized within systems 100 or 200, and may be utilized to perform the methods, processes, and functions described herein. System 300 can include a storage controller CPU cache 307 (such as can be found within separate storage controllers 106 or 107) configured to store a CE, such as CE 320, and memory cache 308 (such as cache 108 or 109) configured to store a NVCE and data, such as NVCE 330 and write data 340.

In the storage controller firmware, the different data structures (e.g., CEs and NVCEs) can be used to store, track, and manipulate data that is received from a host (sometimes referred to as host data). The CE can describe a data buffer containing a specific number of blocks of host data (e.g. 64 blocks). They can be constructed in a CPU's memory and contain various bitmasks (dirty, valid, locked, etc.) indicating a state of an associated cache element that is involved in a read or write operation from a host. A read or write operation can be made up of one or more CEs, which may indicate the cache region that is being used. In some examples, a system can have a memory cache divided into read and write regions and only the write region is backed up or nonvolatile. In some embodiments, the CEs are not persistent (e.g., stored in a volatile memory) and will be lost if the controller fails.

A NVCE can be a backed up version of a specific cache element (e.g., NVCE 330 is a backed up version of CE 320, both corresponding with data buffer 340 storing host data). The NVCE can contain a subset less than all of the data fields that are present in a CE. In some embodiments, the CEs and NVCEs share a one to one mapping of specific data fields that can be used to reconstruct the cache state when a controller boots up or when a surviving controller takes over a partner's cache in the event of failure.

An example CE is shown with multiple fields where a subset (e.g., fields 321 to 325) are backed up to the corresponding NVCE, and other fields (e.g., fields 329) are not backed up to the corresponding NVCE. One or more fields of each CE and NVCE may be updated during I/O operations. In some embodiments, the fields in a CE that are backed up to a corresponding NVCE can include a time stamp field, a data hardened flag field, an I/O identification field, a dirty mask field, or a combination thereof. Other embodiments may include more or less of the fields within the CEs.

A time stamp (TS) field 321 and 331 can indicate the time when the corresponding NVCE was updated. In some embodiments, an update to the corresponding NVCE can happen at the time of data transfer from the host or a data merge, in which case, the data pointed to by two CEs are merged into a single destination CE. In all cases, the time stamp of the NVCEs are updated to maintain relative time ordering, which is used to preserve the order in which the host(s) intended to write data to the persistent storage volumes (e.g., the order in which the write operations were received by the storage controller 106 or 107 from the host 104 or 105). Thus, the time stamp field can indicate when a NVCE was last updated in response to a data transfer from a host or a data merge operation from another CE.

A data hardened flag (DHF) field 322 and 332 can indicate when the data storage controller has completely received the data from the host and the CEs that are involved in the writes have been marked as dirty.

An Input-Output Identifier (IOID) field 323 and 333 can identify a specific host write operation that a CE is associated with. In some embodiments, this number is unique for a given I/O operation. The IOID can be unique in the sense that, all the CEs in that IO operation have the same IOID and that unique IOID can be used to identify the IO operation within the system due to its uniqueness. Also, there can be many CEs that are involved in a single I/O operation and share a common IOID.

A Dirty Mask (DM) field 324 and 334 can be a bit mask to indicate if the CE or NVCE is dirty (e.g., a 64-bit dirty mask for a 64-block host data). A CE or NVCE is marked as dirty when it contains user data that is not yet written to the persistent data storage volumes. Once the data is written out to the persistent data storage volumes, these bits are cleared to indicate that the CE and NVCE is clean.

A Valid Mask (VM) field 325 can be a bit mask used to indicate the blocks that contain valid data; for example, a 64-bit valid mask for a 64-block host data. The VM field 325 can exist in the CE to allow for cache hits for reads for data that has already been written out to the persistent storage (e.g., DSDs 116 or 117). While a valid mask field could be implemented in a NVCE, such is not necessary with processes and operations described herein.

An address (AD) field 326 and 336 can include an indicator of an intended write location, such as an LBA range. For example, an LBA range may be indicated by bits identifying a start LBA and an end LBA to define a range.

During operation, the fields in the NVCE(s) can be used to reconstruct the correct state of a partner cache on the surviving controller when the failed controller has not completed the steps required to preserve data integrity. Examples of how such fields can be used are described herein.

FIG. 4 shows a diagram of a system for preserving data integrity during controller failure, generally designated 400, in accordance with certain embodiments of the present disclosure. System 400 is an example implementation of circuits and data structures that can be utilized within systems 100, 200, or 300, and may be utilized to perform the methods, processes, and functions described herein. System 400 can include a cache 408 configured to store NVCEs. As discussed herein, NVCEs can be used to construct a state of a failed controller's cache in a dual controller active-active storage system. The example cache contents shown are a few simplified examples of the data structures described herein that can be utilized by the processes, methods, and functions described herein. The sizes and data given as examples in the fields of FIG. 4 and discussed herein are used for illustrative purposes only and do reflect any data limitations or requirements of the NVCEs. Utilization of the example data structures by the processes disclosed herein are discussed further below.

Figure 5:
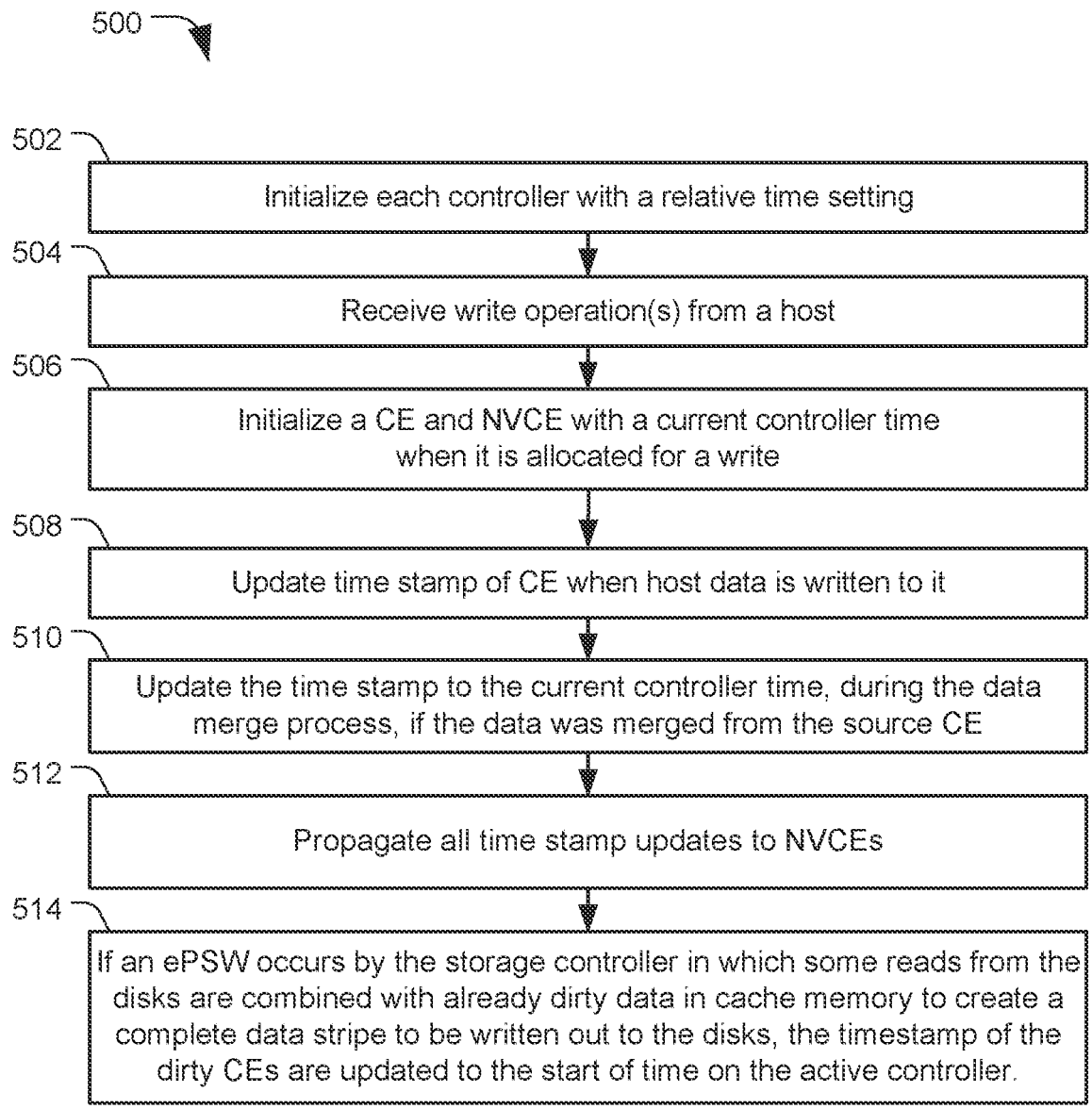
FIG. 5 is a flowchart of a process for preserving data integrity during storage controller failure, in accordance with certain embodiments of the present disclosure.

FIG. 5 shows a flowchart of a process for preserving data integrity during storage controller failure, generally designated 500, in accordance with certain embodiments of the present disclosure. The process 500 can be performed by the hardware described herein, such as systems 100, 200, 300, or 400, and can be used in conjunction with the other processes described herein, such as process 600 or 700. The process 500 can be implemented via firmware on a storage controller.

The process 500 can include initializing each storage controller with a relative time setting, at 502. This can allow each storage controller in an active-active storage controller system, such as systems 100 or 200, to create relative time stamps within the specific storage controller to be associated with received operations or data to maintain a logical execution order of the operations received from the host(s). The initialization of the time stamps can occur upon a system reset, per a command from a host, a detection of an error in the time stamps, or due to another trigger.

When a write operation is received from a host, at 504, the process 500 can allocate one or more CE, and corresponding NVCE(s), both corresponding to the operation and can initialize the one or more CE, and corresponding NVCE(s), with a current storage controller time, at 506. If a host send data for a write operation associated with an allocated CE, the storage controller can update the time stamp of the CE when the host data is written to it, at 508.

The process 500 can also include updating a CE's time stamp to the current storage controller time during a data merge process, if the data was merged from a source CE, at 510. In some embodiments, the value that a merged CE's timestamp is updated to can depend on the order that the "Notify to host" and "Merge the user data" steps are done during the host write process. If "Merge the user data" is done before "Notify to host", then the merged CE's timestamp can just be updated to the current storage controller time to maintain data integrity. If "Notify to host" is done before "Merge the user data", then the merged CE's timestamp can be updated to source CE's timestamp plus one to maintain data integrity. This increment by one can ensure no other CE(s) is likely to have the same timestamp as the one being updated since its small enough to preserve the atomicity of the timestamp and large enough to preserve the uniqueness of the timestamp. Examples and details of data merge processes are provided below.

The relative time stamp updates preserve the logical ordering time line in which the host(s) wrote the data by keeping the merged CE as the newest CE that contains the latest user data that was written by the host. The logical time stamp adjustment performed on the merged CEs are also propagated to the corresponding NVCEs, which can include both the NVCEs at the source controller and the partner controller, at 512.

In situations that involve an ePSW by the storage controller, in which some reads from the persistent data storage devices are combined with the already dirty data in cache memory to create a complete data stripe to be written out to the persistent data storage devices, the timestamp of the newly read dirty CEs, which were earlier clean, can be updated to the start of time on the storage controller, at 514, such as the time when the storage controller booted up. This can ensure that any CEs that are read from the persistent data storage devices and are marked as dirty contain a logical timestamp that is lesser than a duplicate CE that is involved in a subsequent host write, thus making the duplicate CE the newer CE and preserving the logical time order of the host writes. In such an implementation, the timestamp of the fully clean CEs read from disks are updated to the start of time on the storage controller. The timestamp of the CEs with already dirty cache data (can be partially or fully dirty) remains unchanged from earlier.

Thus, performing logical time stamp updates, such as via process 500, can preserve the time order of the write operations performed from a host perspective. By setting up the CE and NVCEs in this way, an active-active storage controller system can address the problems of storage controller failure that can occur before performing the invalidation of duplicate CE and NVCEs.

Figure 6:
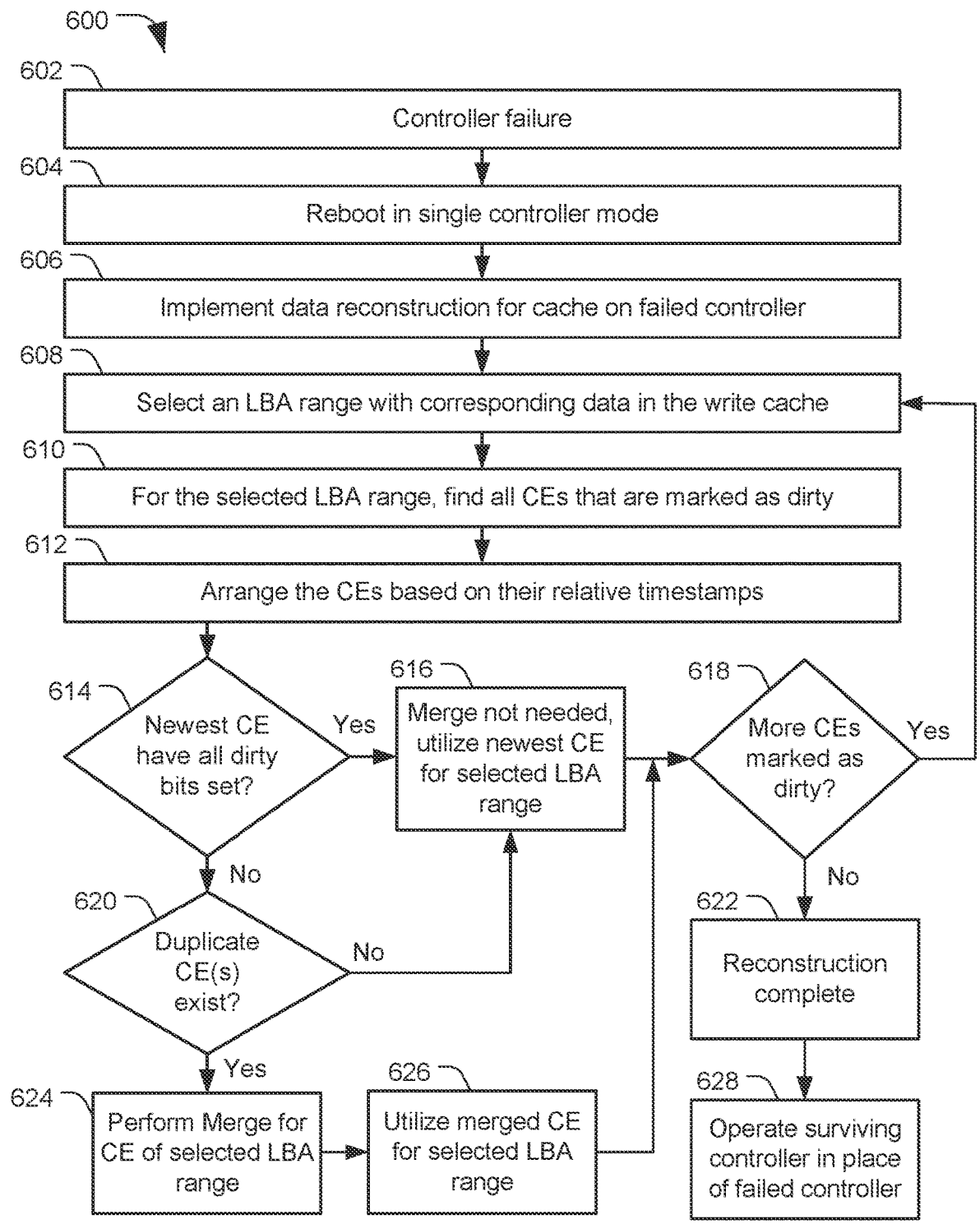
FIG. 6 is a flowchart of a process for preserving data integrity during storage controller failure, in accordance with certain embodiments of the present disclosure.

FIG. 6 shows a flowchart of a process for preserving data integrity during storage controller failure, generally designated 600, in accordance with certain embodiments of the present disclosure. The process 600 can be performed by the hardware described herein, such as systems 100, 200, 300, or 400, and can be used in conjunction with the other processes described herein, such as process 500 or 700. The process 600 can be implemented via firmware on a storage controller.

The process 600 can include determining a storage controller failure of at least one of the storage controllers of an active-active storage controller system, at 602. This can be done via any method that allows a storage controller to detect another storage controller has failed (e.g., unresponsive, defective communications, loss of power indicated, etc.). Detection of such may include determining a loss of a communication ability over a communication link to the non-responsive storage controller, which in some examples may be due to a power failure. In some embodiments, controller failure can be indicated by one or both of the following conditions: (1) the PCIe link between the controllers is detected as being down (e.g., communication ability is not present); (2) a PCIe link recovery is attempted, and if not successful, the partner controller is assumed to be down. When both controllers are powered on and operating, they can exchange heartbeat signals (e.g., a periodic signal generated by hardware or software to indicate normal operation or to synchronize functions) using a hardware communication link (e.g., the PCIe BR link) that can connect CPLDs on each controller board through a midplane or a backplane. If such a heartbeat is not received from one of the controllers, that controller is assumed to be down (e.g., non-operational). In both cases, the controller that is assumed to be down can be put into a reset mode to prevent it from coming back up without a step-by-step recovery process.

When a storage controller failure has been detected, the surviving data storage controller can switch to a single controller mode, at 604, which can take over the failed controller's cache using the processes mentioned herein and initiate a cache reconstruction process to recreate the write cache of the failed storage controller. If the data in the cache was not written out before a storage controller failed, it is important to reconstruct the exact write cache state of the failed storage controller. The cache reconstruction ensures that the data of the write cache can be written out to the persistent data storage in the correct order. The firmware of the surviving storage controller can reconstruct the cache of the controller that failed in a single controller mode (or on the partner controller in an active-active configuration), when it takes over the failed storage controller's cache (e.g., by processing all operation requests that are intended for logical locations previously assigned to the failed storage controller). Because of the nature of write operations, such as discussed herein, duplicate data can exist in the cache of the failed storage controller for an LBA range, as that LBA range has not be stored to persistent data storage. Thus, during a controller failure, the surviving storage controller or the failed storage controller (e.g., after a reboot or when a failover operation is triggered) can reconstruct the correct state of the lost cache to preserve the correct write order of operations within the cache. Thus, in some implementations, the processes described herein (e.g., process 500, 600, or 700) can be implemented on the failed storage controller itself if such storage controller can be recovered and rebooted.

The surviving controller does not necessarily need to reboot to perform a cache reconstruction process as described herein. In some embodiments, the surviving controller can continue to operate and perform a failover operation. In this situation, for example, the cache reconstruction process can be triggered by any one of the following: (1) if only one controller fails, the surviving controller can perform a failover operation, which includes the cache reconstruction process, after the failure is detected, and (2) if there is a power failure or power cycling and on a subsequent reboot only one of the controllers comes back online (e.g., communication link(s) cannot detect the other controller), the surviving controller can perform a failover operation.

The process 600 can then implement a data reconstruction process for the cache of the failed storage controller, at 606. Since the data (NVCEs and host data) are mirrored to the surviving controller, the host data available on the surviving storage controller allows it to build the partner storage controller's view of its cache to perform a data merge and preserve the data integrity.

Rebuilding the cache state can include accessing and organizing all of the CEs in the failed cache based on the NVCEs that were backed up to the backup storage controller. This can include selecting an LBA range with corresponding data in the write cache, at 608, and for that selected LBA range, finding all CEs that are marked as dirty, at 610, by checking the dirty bit(s) set in the corresponding NVCE. The selected LBA range may be selected based on a range of LBAs that is associated with a write operation from a host.

The selected CEs that are marked as dirty may be arranged based on their relative timestamps (e.g. as indicated in each corresponding NVCE), at 612. In some embodiments, the selected CEs may be arranged by placing the oldest CE as a base CE and the newer duplicates arranged in an increasing order of their timestamp. Then, the CE with the highest timestamp value is the newest CE that was written to the failed controller by the host.

The process 600 may then determine whether the newest CE has all dirty bits set, at 614. When the newest CE has all the dirty bits set (e.g. each bit, which correspond to a block of data of the CE, indicates that every block of the CE is dirty), then a merge is not required and the process 600 may utilize the newest CE for the selected LBA range. When the newest CE has all the dirty bits set, this indicates that the newest CE was completely written to by the host; thus, any older CEs that might be in the cache from the host are not needed as they would have been fully overwritten by the newest CE.

For example, referring to FIG. 4, the $2^{nd}$ NVCE shown has a dirty mask (DM) having all the dirty bits set to indicate all the blocks of data represented by the CE have been written per the associated operation. This allows the process 600 to stop searching the cache as a merge is not needed or unnecessary. Thus, the $7^{th}$ NVCE, which is older per the timestamp (TS), does not need to be considered even though it corresponds to a write operation for the same LBA range.

When the newest CE does not have all dirty bits set, at 614, the process 600 may then determine if any duplicate CEs exist, at 620. If there are no duplicate CEs, such that there are no more CEs in the backed up cache that correspond to the selected LBA range, the merge is not needed and the newest CE is utilized, at 616. For example, referring to FIG. 4, the $3^{rd}$ NVCE indicates that it corresponds to LBA range 0880 (the LBA range indicators of FIG. 4 are not representative of how a LBA range data is typically stored but are used for ease of illustration) and no other NVCE corresponds to the same LBA range, thus a merge is unnecessary for the $3^{rd}$ NVCE with the other example NVCEs shown in FIG. 4.

When there are one or more duplicate CEs, at 620, the process 600 can perform a merge of the selected duplicate CE(s) and the newest CE (e.g. the merge operation 700 shown in FIG. 7), at 624. The resulting merged CE may then be utilized as the reconstructed CE for the selected LBA range, at 626.

Once a newest CE or merged CE is determined to be utilized for a corresponding CE, the process 600 can then determine if there are more CEs marked as dirty, at 618, and if there is, repeat the process back to selecting an LBA range to determine corresponding CEs in the cache, at 608. If there are no more CEs marked as dirty, the process 600 may determine that reconstruction of the failed cache is complete, at 622.

The reconstructed cache can then be managed via the surviving storage controller (or in some instances by the reset failed controller), at 628. If the failed storage controller does not come back online in a state capable of resuming its operational capabilities to manage the cache operations, the system may permanently assign the logical units the failed storage controller was managing operations for to the surviving storage controller, or until another storage controller replaces the failed storage controller.

This multi-stage approach, creating NVCEs with relative time stamps and utilizing the time stamps for cache reconstruction, solves the problem of resolving the duplicate copies of user data on the surviving storage controller by constructing the correct state of partner's cache and making the write process immune to controller failures while preserving the user data integrity. The processes discussed herein also work seamlessly for lockless write cache based atomic writes also. The systems, processes, and functions described herein are also scalable to multiple controller configurations with greater than two storage controllers; and the two storage controllers configurations discussed herein are not limiting and have been provided to give examples and illustrate the systems, processes, and functions hereof.

Figure 7:
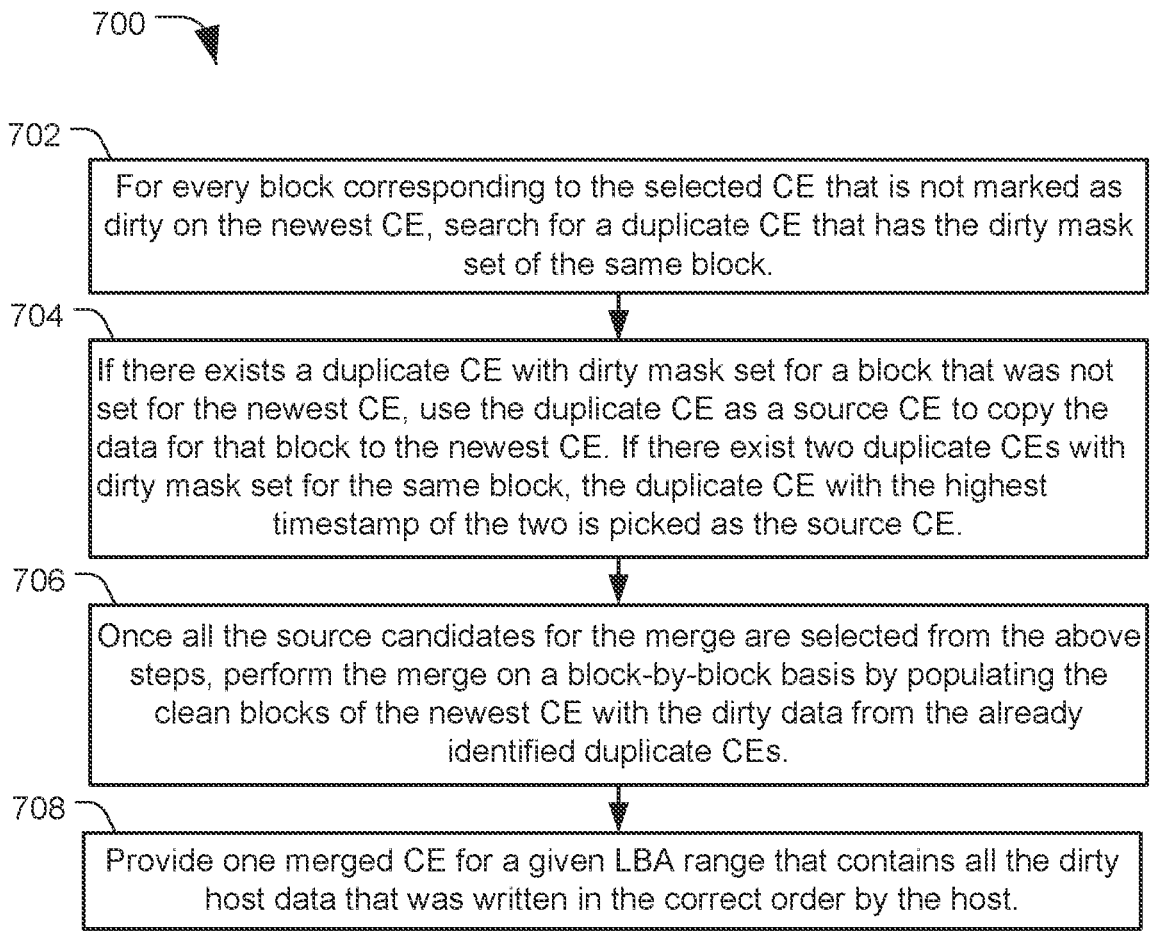
FIG. 7 is a flowchart of a process for preserving data integrity during storage controller failure, in accordance with certain embodiments of the present disclosure.

FIG. 7 shows a flowchart of a process for preserving data integrity during storage controller failure, generally designated 700, in accordance with certain embodiments of the present disclosure. The process 700 can be performed by the hardware described herein, such as systems 100, 200, 300, or 400, and can be used in conjunction with the other processes described herein, such as process 500 or 600. The process 700 is an example data merge process that can be utilized in process 600 to perform the data merge at 624. The process 700 can be implemented via firmware on a storage controller.

The process 700 can perform a data merge of selected CEs by searching for a duplicate CE if the newest CE has partial dirty bits set, at 702. Having only partial (less than all) dirty bits set indicates that the newest CE, or other duplicate CEs, are only a partial overwriting of the LBAs associated with that CE and that older duplicates could possibly contain data that is indicated as dirty in older CEs but not in newer CEs. When such occurs, the data from the older CEs needs to be merged with the newer CE to create a fully updated CE based on the cache state at the time of the failure. Thus, the search process 700 can determine if there are duplicates present (including the base CE) for every block of the selected CE that is not marked as dirty on the newest CE, at 702. The search for a duplicate CE that has the dirty mask set can be done via a dirty bit mask with a bit, representing a dirty state, for each block of the CE.

In some embodiments, if there exists a duplicate CE with a bit of a dirty mask set for a block that was not set for the newest CE, the merge process, at 704, can use the duplicate CE as a source CE to copy the data corresponding to that block to the newest CE. If there exist two or more duplicate CEs with a bit of a dirty mask set for the same block, the duplicate CE with the highest timestamp is picked as the source CE, at 704. Thus, the search can follow the same order as that of the time stamp; the duplicate CEs can be selected based on the decreasing order of their time stamp.

Once all the source CE candidates for the merge are selected from the above steps, the merge can be performed on a block-by-block basis; thus, populating the clean blocks of the newest CE with the dirty blocks from the already identified duplicate CEs, at 706. The process 700 can then provide one merged CE for a given LBA range that contains all the dirty host data in the correct order as written by the host, at 708. The process 700 can generate a new time stamp for the merged CE that can be equal to the sum of the newest CE's time stamp and one, at 708. In some embodiments, this increment by one can ensure no other CEs will have the same timestamp as the one being created by the merge process since the increment is small enough to preserve the atomicity of the timestamp and large enough to preserve the uniqueness of the timestamp as compared to other CEs.

For an example of the merge process, referring to FIG. 4, the $1^{st}$ NVCE shown has a dirty mask (DM) having less than all the dirty bits set to indicate the blocks of data represented by the CE that have been written per the associated operation. The process 700 can then search for duplicates for the same blocks of data by searching for a same LBA range (e.g., LBA range 1024), at 702. The duplicate search would identify the $4^{th}$, $5^{th}$, $6^{th}$, and $9^{th}$ NVCEs and corresponding CEs as being duplicates of the $1^{st}$ NVCE and CE. The process 700 would then proceed to merge the data from the duplicate CEs, at 704 and 706, resulting in a new merged cache element having a dirty mask of 01111111 which can be provided as an output of the merge process and set to have a newest relative timestamp (e.g., TS: 0122), at 708. Note that, in some embodiments, a merged CE's timestamp needs to be updated to current storage controller time or such timestamp plus one (+1) during the process 500, that is, during a data merge process that happens after the host has sent data for the write operation. Updating the CE's timestamp plus one is not absolutely required while reconstructing CEs based on the NVCEs after a failure (e.g. during processes 600 and 700).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing this disclosure. Other embodiments may be utilized and derived from this disclosure, such that structural and logical substitutions and changes may be made without departing from the scope of this disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments and elements can be made, and other embodiments not specifically described herein will be apparent to those of skill in the art upon reviewing the description. For example, while the details discussed above refer to an active-active controller configuration, the systems and processes disclosed herein could be applied to other types of controller configurations. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a first storage controller configured to operate in an active-active controller configuration with a second storage controller to manage host data write operations, the first storage controller configured to:
   store a first nonvolatile cache element (NVCE) corresponding to a host write operation intended for the second storage controller to a first memory of the first storage controller, the first NVCE including a relative timestamp based on an order the second storage controller received the host write operation;
   when the second storage controller fails, recreate a state of a write cache of the second storage controller based on the first NVCE and the relative timestamp; and
   write data blocks corresponding to the recreated state of the write cache of the second storage controller to a persistent storage.

2. The apparatus of claim 1 comprising the first storage controller further configured to:
   when the second storage controller fails, merge data of the first NVCE with data of other NVCEs in the first memory corresponding to other write operations received by the second storage controller and that have overlapping write locations with the first NVCE.

3. The apparatus of claim 2 comprising the first storage controller further configured to:
   perform the merge on a block-by-block basis based on the relative timestamp to produce a new cache element indicating the data to be written to the write locations as an output of the merge process; and
   write data blocks to the write locations based on the new cache element.

4. The apparatus of claim 3 further comprising:
   the first NVCE and the other NVCEs each include a dirty mask field to indicate when associated host data has not yet been stored to the persistent storage.

5. The apparatus of claim 4 further comprising:
   the dirty mask field of a selected NVCE indicates which blocks of the overlapping write locations include host data not stored to the persistent storage for the selected NVCE;
   the first storage controller further configured to perform the merge on the block-by-block basis including:
   comparing dirty mask fields and relative timestamps of NVCEs corresponding to the overlapping write locations; and
   merging together host data for each block from a most recent NVCE indicating dirty data for that block.

6. The apparatus of claim 1 comprising the first storage controller further configured to:
   update the relative timestamp based on changes to the first NVCE from a data transfer from a host or a data merge operation with another NVCE.

7. The apparatus of claim 1 further comprising:
   the second storage controller communicatively coupled to the first storage controller to operate in the active-active controller configuration, the second storage controller configured to:
   store a second nonvolatile cache element (NVCE) corresponding to a host write operation intended for the first storage controller to a second memory of the second storage controller; and
   when the first storage controller fails, recreate a state of a write cache of the first storage controller based on the second NVCE.

8. An apparatus comprising:
   a first storage controller configured to operate in an active-active controller configuration with a second storage controller to manage host data write operations, the first storage controller configured to:
  mirror data corresponding to a host write operation intended for the second storage controller into a first memory of the first storage controller, the mirrored data including a relative timestamp based on an order the second storage controller received the host write operation;
  when the second storage controller fails, merge the mirrored data with data corresponding to other write operations received by the second storage controller on a block-by-block basis based on the relative timestamp; and
  write the merged data corresponding to the second storage controller to a persistent storage.

9. The apparatus of claim 8 further comprising:
the first memory, including a nonvolatile cache associated with the first storage controller;
a computer bus interface of the first storage controller, for communicating with the second storage controller;
the first storage controller configured to mirror the data corresponding to the host write operation, further including:
  receive the data from the second storage controller;
  store a first nonvolatile cache element (NVCE) corresponding to the host write operation to the first memory, the first NVCE including the relative timestamp; and
  when the second storage controller fails, recreate a state of a write cache of the second storage controller based on the first NVCE and the relative timestamp.

10. The apparatus of claim 9 further comprising:
the first storage controller includes a volatile cache memory;
the first storage controller further configured to:
  receive a second write operation from a host directed to the first storage controller;
  store a first volatile cache element, including a number of data fields to indicate metadata corresponding to the second write operation, to the volatile cache memory; and
  provide data from the first volatile cache element to the second storage controller via the computer bus interface.

11. The apparatus of claim 10 comprising the first storage controller further configured to:
  generate a second NVCE based on the second write operation, the second NVCE including a subset of the data fields of the first volatile cache element; and
  store the second NVCE to the first memory.

12. The apparatus of claim 11 comprising the first storage controller further configured to:
  merge the mirrored data when the second storage controller fails, further including:
    merge data of the first NVCE with data of other NVCES in the first memory corresponding to other write operations received by the second storage controller and that have overlapping write locations with the first NVCE.

13. The apparatus of claim 12 comprising the first storage controller further configured to:
  merge the data of NVCEs that have overlapping write locations on the block-by-block basis, further including:
    select a persistent storage address range, identified in an NVCE in the first memory, corresponding to host writes directed to the second storage controller;
    determine selected NVCEs, corresponding to the second storage controller and directed to the persistent storage address range, that correspond to dirty data that has not been written to the persistent storage;
    determine most recent dirty data for each block of the persistent storage address range, based on relative timestamps of the selected NVCEs; and
    generate a new cache element corresponding to the most recent host dirty data for each block from the selected NVCEs, to recreate the state of the write cache of the second storage controller based on a correct order of host writes.

14. The apparatus of claim 13 comprising the first storage controller further configured to:
  determine most recent dirty data for each block of the persistent storage address range, further including:
    evaluate a dirty mask field for a most recent NVCE directed to the persistent storage address range, the dirty mask field identifying which blocks of the persistent storage address range have dirty data associated with the most recent NVCE;
    compare the dirty mask field of the most recent NVCE to dirty mask fields of other NVCEs directed to the persistent storage address range to identify NVCEs having dirty data for blocks that are not dirty in the most recent NVCE; and
    determine the most recent dirty data for each block based on the dirty mask fields and the relative timestamps of the selected NVCEs.

15. The apparatus of claim 13 comprising the first storage controller further configured to:
  determine that a selected block of the persistent storage address range does not have dirty data corresponding to any of the selected NVCEs;
  perform a read operation to the persistent storage to retrieve old data corresponding to the selected block;
  merge the old data with the most recent dirty data to generate a complete data stripe for the persistent storage address range; and
  write the complete data stripe to the persistent storage.

16. A method comprising:
  operating a first storage controller and a second storage controller in an active-active controller configuration where both storage controllers are actively available to support host data write operations;
  reconstructing a write cache of the second storage controller, by the first storage controller, to maintain a logical write order between multiple writes directed to a same persistent storage address, including:
    mirroring, at the first storage controller, data corresponding to a first host write operation intended for the second storage controller into a first memory of the first storage controller, the mirrored data including a relative timestamp based on an order the second storage controller received the first host write operation;
    determining a failure condition of the second storage controller; and
    based on the failure condition, performing a merge operation at the first storage controller, on a block-by-block basis based on the relative timestamp, to combine the mirrored data with data in the first memory corresponding to other write operations received by the second storage controller; and
    writing merged data from the merge operation to a persistent storage.

17. The method of claim 16 further comprising:
receiving, at the first storage controller, a second host write operation directed to the first storage controller;
storing a first volatile cache element, including a number of data fields to indicate metadata corresponding to the second host write operation, to a volatile cache memory of the first storage controller;
providing data from the first volatile cache element to the second storage controller via the first storage controller;
mirroring the data corresponding to the first host write operation at the first storage controller, further including:
receiving the data from the second storage controller;
storing a first nonvolatile cache element (NVCE) corresponding to the first host write operation to a nonvolatile element of the first memory, the first NVCE including the relative timestamp; and
based on the failure condition, recreating a state of a write cache of the second storage controller based on the first NVCE and the relative timestamp.

18. The method of claim 16 further comprising:
performing the merge operation further includes:
selecting a persistent storage address range corresponding to the first host write operation;
determining selected cache elements, located in the first memory and corresponding to host write operations directed to the second storage controller, that are directed to the persistent storage address range;
determining most recent dirty data, that has not been written to the persistent storage, for each block of the persistent storage address range, based on relative timestamps of the selected cache elements; and
generating a new cache element corresponding to the most recent dirty data for each block from the selected cache elements, to recreate a state of the write cache of the second storage controller based on a correct order of host writes.

19. The method of claim 18 further comprising:
determining most recent dirty data for each block of the persistent storage address range, further including:
evaluating a dirty mask field of a most recent cache element directed to the persistent storage address range, the dirty mask field identifying which blocks of the persistent storage address range have dirty data associated with a cache element of the dirty mask field;
comparing the dirty mask field of the most recent cache element to a dirty mask fields of other cache elements directed to the persistent storage address range to identify cache elements having dirty data for blocks that are not dirty in the most recent cache element; and
determining the most recent dirty data for each block based on the dirty mask fields and the relative timestamps of the selected cache elements.

20. The method of claim 18 further comprising:
determining, at the first storage controller, that a selected block of the persistent storage address range does not have dirty data corresponding to any of the selected cache elements;
performing, via the first storage controller, a read operation to the persistent storage to retrieve old data corresponding to the selected block;
merging the old data with the most recent dirty data to generate a complete data stripe for the persistent storage address range; and
writing the complete data stripe to the persistent storage.

* * * * *